US006423168B1

(12) United States Patent
Valiulis

(10) Patent No.: US 6,423,168 B1
(45) Date of Patent: Jul. 23, 2002

(54) SCANNING HOOK OVERLAYS AND METHOD OF MANUFACTURE OF SAME

(75) Inventor: Thomas E. Valiulis, Rockford, IL (US)

(73) Assignee: Southern Imperial, Inc., Rockford, IL (US)

( * ) Notice: Subject to any disclaimer, the term of this patent is extended or adjusted under 35 U.S.C. 154(b) by 0 days.

(21) Appl. No.: 09/224,986

(22) Filed: Jan. 4, 1999

Related U.S. Application Data

(63) Continuation-in-part of application No. 08/940,859, filed on Sep. 29, 1997.

(51) Int. Cl.[7] .......................... B32B 31/18; G09F 3/10

(52) U.S. Cl. ...................... 156/226; 156/227; 156/247; 156/250; 156/267; 156/269; 156/344; 40/124.13; 40/299.01; 40/124.4; 40/642.01

(58) Field of Search ............................... 156/226, 227, 156/247, 249, 250, 269, 344, 267; 40/124.13, 299.01, 124.4, 642.01, 657, 662

(56) References Cited

U.S. PATENT DOCUMENTS 3,735,515 A 5/1973 Lagert
3,912,084 A 10/1975 Valiulis
4,364,787 A * 12/1982 Radzins ..................... 156/164
4,787,159 A 11/1988 Fast
4,882,868 A 11/1989 Fast
4,987,692 A 1/1991 Fast
5,123,189 A * 6/1992 Fast et al. ..................... 40/299
5,261,175 A 11/1993 Gebka
5,325,616 A 7/1994 Valiulis
5,421,113 A 6/1995 Gebka et al.
5,628,858 A * 5/1997 Petrou ........................ 156/249
5,728,469 A 3/1998 Mann et al.
5,843,267 A * 12/1998 Cashaw et al. ............ 156/324
5,868,892 A * 2/1999 Klima, Jr. .................. 156/267
6,015,470 A * 1/2000 Treleaven et al. .......... 156/267

OTHER PUBLICATIONS

Southern Imperial, Inc. Sign & Banner Systems Catalog (Effective Date: Sep. 25, 1996—Form SBSC–9825996)—2 pages.

Southern Imperial, Inc. The Complete Reference Guide (World Wide Manufacturer of Quality Display Products) (Approx. Jan. 1998)—2 pages.

P. 19 from a Mar. 19, 1996 catalogue of Southern Imperial, Inc.

* cited by examiner

*Primary Examiner*—Sam Chuan Yao
(74) *Attorney, Agent, or Firm*—Leydig, Voit & Mayer, Ltd.

(57) ABSTRACT

Discloses a method of making scanning hooks with a release agent on the label attachment tab. Stock is formed by laminating a plastic sheet which will provide the main carrier body of the overlay and a thin film which has a release agent strongly bonded to its outer surface. The film is bonded to the main plastic layer, such as by an adhesive. Overlay blanks are cut from the resulting laminate stock as by die cutting. The overlay blanks then are bent and mounted on scanning hooks, with the tab portion extending essentially vertically and presenting an outwardly exposed release surface which provides ready appliability, removability and replaceability of merchandising labels which bear information related to the products supported on the hanger.

17 Claims, 5 Drawing Sheets

SCANNING HOOK OVERLAYS AND METHOD OF MANUFACTURE OF SAME

CROSS-REFERENCE TO RELATED APPLICATIONS

This is a continuation-in-part of my co-pending application Ser. No. 08/940,859 entitled Marketing Displays Providing Ready Replaceability Of Adhesive Display Labels filed Sep. 29, 1997 and is related to my pending applications Ser. No. 08/752,529 entitled Merchandising Hangers Providing Ready Replaceability Of Adhesive Display Labels and Ser. No. 08/754,245 entitled Marketing Displays Providing Ready Replaceability Of Adhesive Display Labels, both filed Nov. 20, 1996. The disclosures of each of those three applications is are incorporated herein by this reference.

FIELD OF THE INVENTION

This invention relates to devices adapted for mounting over an elongated merchandise support hook (e.g., a "pegboard" hook or "scanning hook") to display information that relates to merchandise supported on the hook. Such devices typically comprise an elongated strip adapted to overlie the hook and present a tab panel for receipt of a label at the front of the hook. Such devices, sometimes referred to as "tags" or "overlays", are referred to herein as "overlays" or an "overlay".

BACKGROUND OF THE INVENTION

In general, overlays are stamped or die-cut from a sheet of relatively flexible plastic and comprise an elongate strip adapted to overlie a merchandise support hook. A mounting portion is bent downwardly at the rear end of the strip and is adapted to be secured releaseably to the hook in order to attach the overlay to the hook and/or to the structure which supports the hook in its mounted, product supporting position. Extending downwardly at the front end of the strip is a tab panel which is adapted to support a label that provides information relating to the merchandise supported on the hook, e.g., price, item name, machine-readable product identification, etc. In many cases, the merchandise is packaged on a display card whose upper end is formed with a hole for receiving the hook. By way of example, such overlays are disclosed in Valiulis U.S. Pat. No. 5,325,616, Fast U.S. Pat. No. 4,987,692 and Gebka U.S. Pat. Nos. 5,261,175 and 5,421,113, the disclosures of which are incorporated herein by this reference.

The pending patent applications cited under "related applications" above disclose recent improvements introduced by Southern Imperial, Inc. of Rockford, Illinois, in which merchandising pegboard hooks (sometimes referred to herein as "scanning hooks"), merchandise supporting shelves and other merchandise supports are provided with label supporting surfaces that have a covering of a release material such as silicone to provide a reduced release value for adhesive labels. This improvement also provides ready appliability, removability and replaceability of adhesive display labels to facilitate successive replacement of the labels as information regarding products supported on these supports changes under typical retail merchandising practices.

OBJECTS AND SUMMARY OF THE INVENTION

The general aim of the present invention is to provide improved overlays for scanning hooks.

An object of the invention is to provide such overlays with a label release surface on the label support panel in a simple and inexpensive manner.

A specific object of the invention is to provide an improved method for making such overlays which have a label release surface on the label support panel.

Another object of the invention is to provide improved overlays with a label release surface on the label support panel.

These and other features and advantages of the invention will be more readily apparent upon considering the following description of a preferred exemplified embodiment of the invention and upon reference to the accompanying drawings.

While the invention is described and disclosed in connection with certain presently preferred embodiments and procedures, it is not intended to limit the invention to those specific embodiments. Rather it is intended to cover all alternative embodiments and modifications as fall within the spirit and scope of the invention.

DETAILED DESCRIPTION OF THE PREFERRED EMBODIMENT

Figure 1:
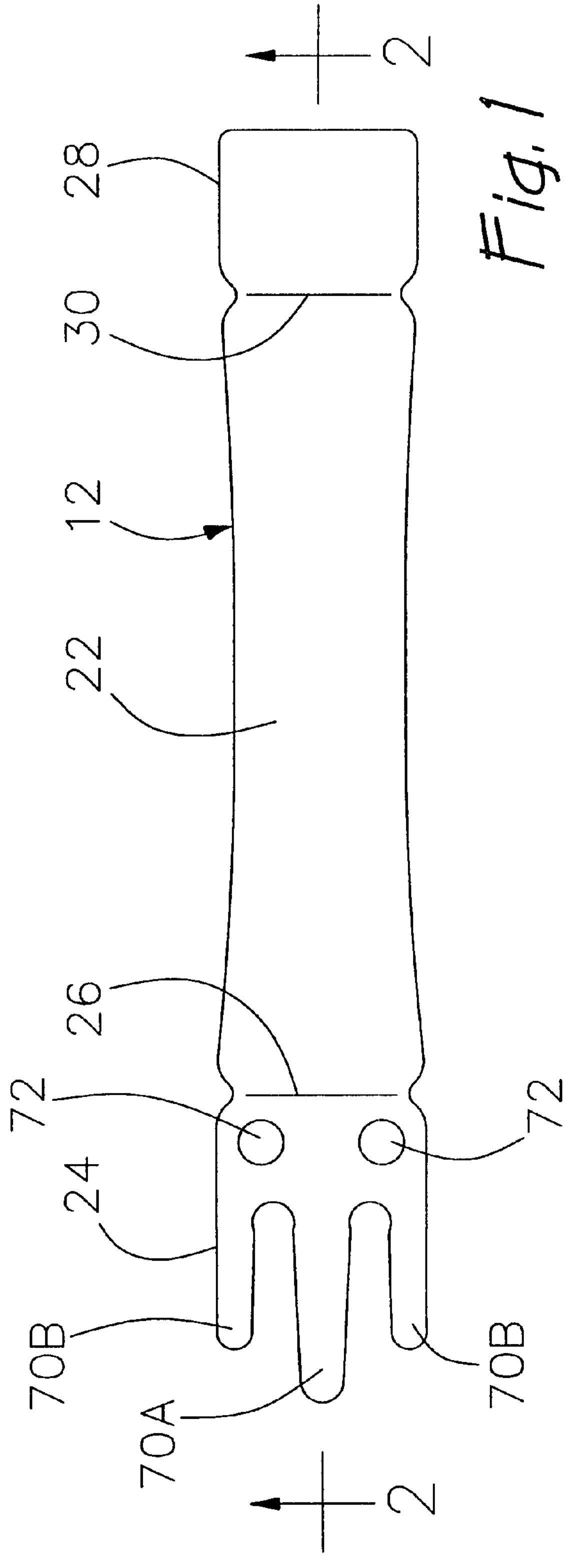
FIG. 1 is a plan view of a blank for forming an overlay embodying unique features of the present invention, and designed for use with one standard form of peg hooks.
Figure 2:
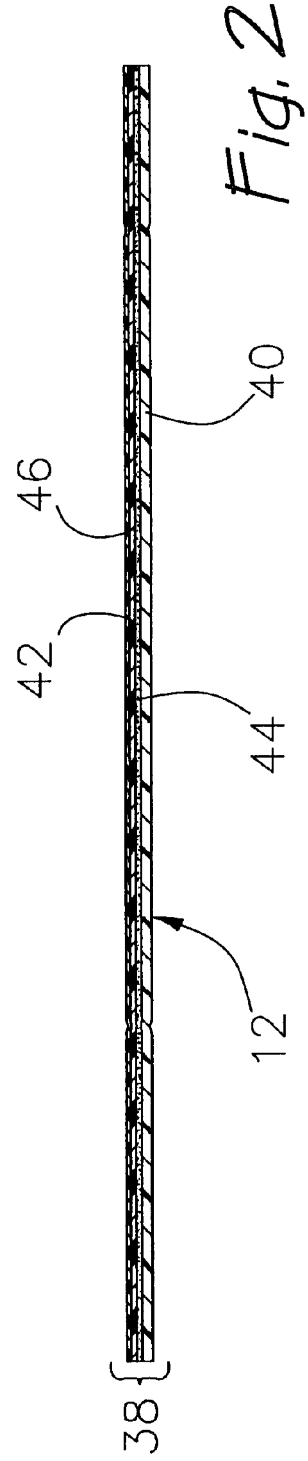
FIG. 2 is a longitudinal sectional view of the overlay of FIG. 1, taken substantially along the line 2—2 of FIG. 1.
Figure 3:
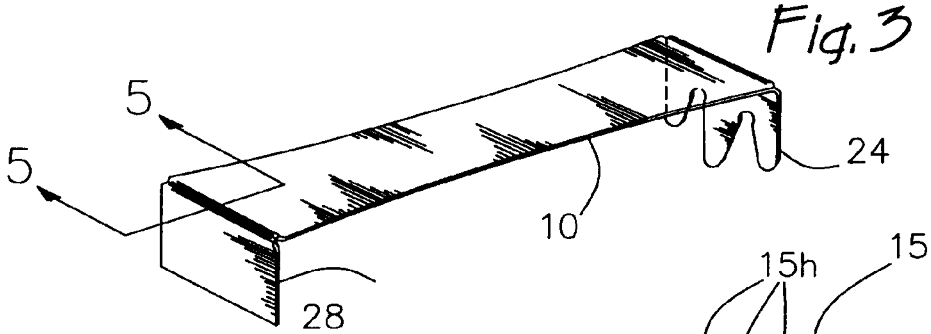
FIG. 3 is a perspective view of an overlay formed from the blank of FIG. 1.
Figure 4:
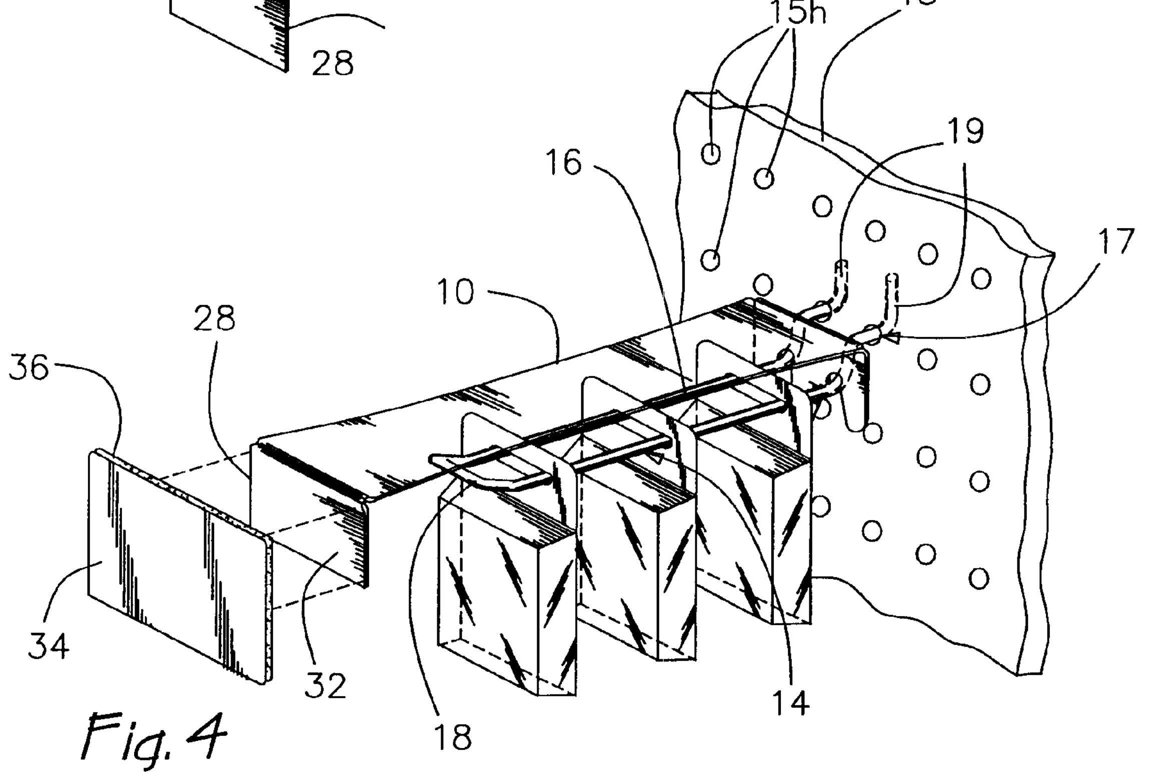
FIG. 4 is a perspective view illustrating the overlay of FIG. 3 mounted on a peghook hanger.
Figure 5:
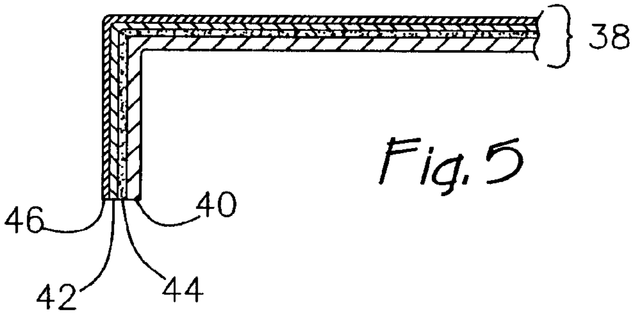
FIG. 5 is an enlarged fragmentary cross section taken substantially along line 5—5 of FIG. 3.
Figure 6:
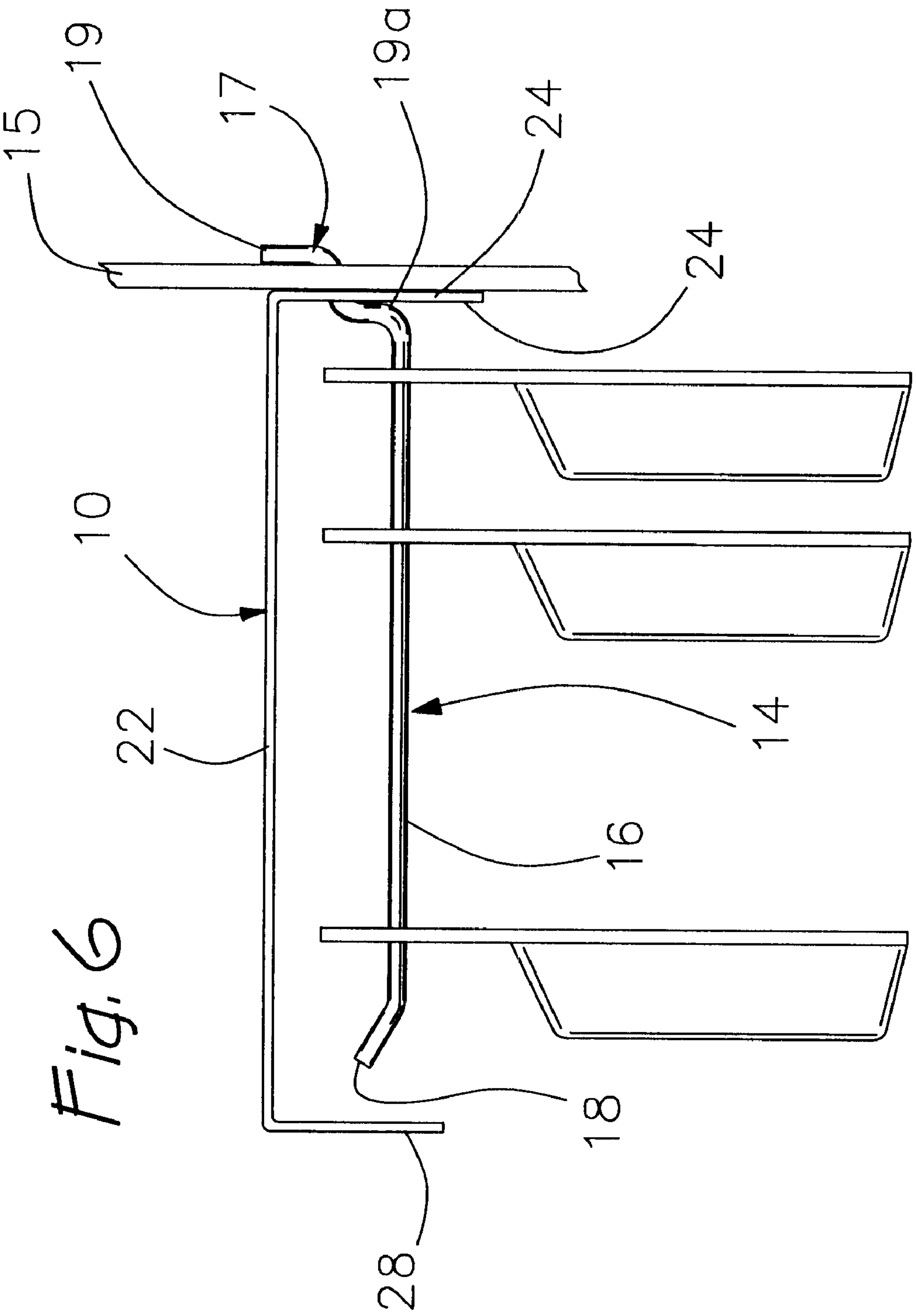
FIG. 6 is a side view of the hanger and overlay assembly as in FIG. 4, and showing products supported on the peghook.

FIGS. 1–6 illustrate an overlay 10 which is formed from a flat blank 12 as seen in FIGS. 1 and 2 into the shallow U-shaped configuration seen in FIG. 3 and then mounted on a hook or hanger 14 as seen in FIGS. 4 and 6. The hook 14 is one of several types commonly used for supporting and displaying merchandise from a panel or pegboard 15 of the type formed with a series of vertically spaced and horizontally extending rows of spaced holes 15*h*, e.g., as seen in FIGS. 4 and 6. The hook 14 includes an elongate product support arm 16 which extends from a mounting section 17 to a distal end at 18. The mounting section 17 includes mounting legs or "horns" 19 and a lower abutment at 19*a* for engaging a pegboard or the like and supports the hook 14 on such a board with the arm 16 in a generally horizontal position as is well known in the art and illustrated generally in FIGS. 4 and 6. Such hooks are commonly used in retail merchandising.

Figure 7:
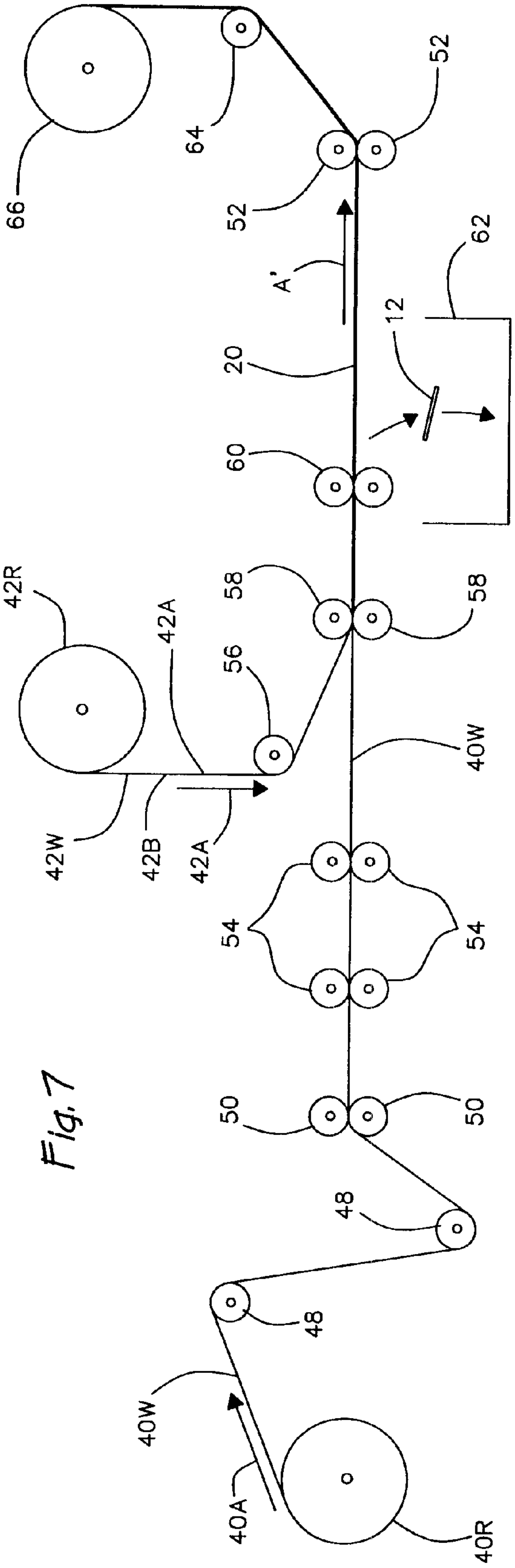
FIG. 7 is a schematic illustration of the method of forming overlay blanks in accordance with the unique features of the present invention.

Blank 12 is stamped from a flexible and relatively thin plastic laminate 20, as seen in FIG. 7 and as will be described further below. The blank 12 includes an elongate body 22 of a configuration to overlie the hook arm 16. A mounting flange 24 is integral with the body 22, being joined to one end of that body along a fold line 26. Another flange or tab 28 also is integral with the body 22 at its opposite end, being joined thereto along a fold line line or bend line 30. In use, the mounting flange 24 and tab 28 are folded or bent downwardly at the respective lines 26, 30 to extend substantially normal to the plane of the body 22. When the overlay 10 is mounted on a hook 14, the mounting flange 24 engages the mounting section 17 of the hook 14, to retain the overlay on the hook with the elongate body 22 overlying the hook arm 16. The tab 28 shields the tip end of the hook arm and presents an outwardly exposed generally vertical label support surface 32 for receipt thereon of an informational label 34.

The label 34 includes a coating or layer 36 of pressure sensitive adhesive on one side for adherent attachment to the label support surface 32. Typically, the label 34 is printed on its outer side with information pertinent to the products supported on the arm 16, such as product identification, price, and inventory indicia. My three copending applications identified above relate to providing a release layer for adherent attachment of labels 34 to the surface 32 while also providing easy peeling removal and replacement of the label with a fresh label bearing new information whenever appropriate and desired by the merchandiser. This invention is directed to producing overlays with such a label release surface on the label support panel 28 in a simple and inexpensive manner.

As illustrated in the cross sectional views of FIGS. 2 and 5, wherein the various layers are shown in exaggerated thicknesses, the blank 12, and hence the overlay 10, is a laminate 38. That laminate comprises a basic plastic support layer 40 and a release agent carrier layer 42 which is bonded to the layer 40 by an adhesive 44. The release agent carrier layer 42 carries a release agent in the form of a coating or layer 46 covering its outward surface. Thus the entire upper surface of the blank 12, including particularly the tab 28, is covered with the release agent 46. The body layer 40 is of a material to provide the main support strength and configuration of the overlay 10. That is, it is bendable about the fold lines 26 and 30, which may be enhanced by being creased or perforated, and has sufficient strength, integrity and absence of shape-memory to maintain the general U-shaped configuration illustrated in FIGS. 3 and 4. The release agent layer must be bonded to its underlayment with sufficient strength and integrity to avoid easy removal as by rubbing, and to avoid removal with the adhesive of an overlying adhered label 34 when such a label is removed. That is, the release agent must remain in place for reception, retention and release of successive labels applied at the same label site. To those ends, and because conventional inexpensive release agents, such as silicones, do not form strong bonds with various plastics which often are used for forming the body layer 40, the blank 12 is formed as a laminate which includes the layer 42 of a material to which the release agent 46 will bond securely and which in turn is readily bondable to the main support layer 40 such as by the adhesive layer 44. Other bonding techniques may be utilized.

FIG. 7 illustrates, somewhat schematically, a process for producing the blanks 12 that subsequently are formed into the overlays 10. In FIG. 7, a continuous web sheet 40W of a plastic which is suitable for forming the body layer 40 is supplied as a roll 40R. Similarly, a continuous web sheet 42W of another material, which strongly bonds with release agents and which is readily adhered to the main support layer 40 with readily available and economical adhesives, is supplied in a roll 42R. The release agent 46 is preapplied to the inner surface of the web 42W, that is to the inner surface in roll 42R, and the bonding adhesive 44 is preapplied to the opposite or outer surface 42B of that web. Thus the release agent 46 on the web 42W also serves as the release agent for releasing the respective convolutions of roll 42R from one another as the web is unwound during the manufacturing process.

In the fabrication process, the web 40W passes from the roll 40R, around appropriate guide rollers 48 (in the direction of the arrow 40A), then between first nip rollers 50 which grip the web 40W to maintain tension on the web as it passes through the processing steps to a second pair of nip rollers 52 which pull the web 40W in tension through the processing steps (in the direction of the arrow A). The web 40W may be printed at a printing station represented by printing rolls 54 prior to entering the laminating step, such as to add instructions or promotional information. Simultaneously, the web 42W passes from the roll 42R and around an appropriately positioned guide roller 56 (in the direction of the arrow 42A) and converges at a shallow angle with the web 40W between a pair of laminating pressure rollers 58. The adhesive 44 is carried on the outer surface of web 42 (the left-hand side of the vertical run in FIG. 7). As the webs 40W and 42W engage one another and pass between the rollers 58 the adhesive 44 bonds the web 42W to the web 40W. Thereafter a rotary die 60, with an appropriate die configuration thereon, cuts the individual blanks 12 from the laminate web as it passes therethrough. The cut blanks 12 drop from the main web to a suitable collector such as the illustrated receptacle 62 or a cross conveyer (not shown). The remainder or “waste” portion of the laminate web passes through the nip rollers 52, around an appropriate guide roller or rollers as at 64, and is collected by winding into a “waste roll” at 66.

The dies 60 preferably cut the blanks 12 from the laminate web in a pattern such that the blanks 12 are formed side by side, with their longitudinal axes transverse to the length of the web. The blanks also may be embossed, preferably by the dies 58, to impress score lines defining the fold lines 26, 30 and/or to imprint useful information such as instructions, e.g., “This side up.” or “This side out.” For example, the latter is especially useful to ensure that the user folds and mounts the overlay with the release surface outward.

It will be appreciated that the laminate may be formed in other ways, such as by other continuous web sheet processes or by laminating discrete sheets of like size and configuration in an appropriate reciprocating press or by feeding the stacked lamina sheets through rotary compressing rolls. Also, the blanks may be cut from the laminated sheets by various means, including reciprocating stamping dies as well as rotary dies, or other cutting means.

The body layer 40 preferably is a clear polyvinylchloride (PVC) while the lamina 46 preferably is a clear thin film of biaxially oriented polyppropylene (BOPP), e.g. 1–2 mil thickness, with a silicone release layer adhered or bonded to one surface. That bonding may be by any appropriate application and bonding technique such as chemical bonding and/or electrostatic or UV curing. A variety of techniques are well known for such application and bonding of silicone materials as a release agent. Such thin carrier layers with a silicone or other release agent on one side are available from various suppliers, and typically are used to protect pressure sensitive adhesive surfaces. The adhesive layer, which is pre-bonded to the web sheet 42W, may be any appropriate permanent adhesive, such as rubber-based or acrylic-based, and preferably also is clear after formation of the laminate. Accordingly in this preferred embodiment the blanks 12 are clear, that is, transparent. However, they may be produced in various colors and/or with information printed, embossed or otherwise carried thereon.

The manufacturing method as described above contemplates that the release agent is continuous and extends the full width and length of the portion of the web sheet from which the blanks 12 are cut. However, this is not necessary to obtaining the desired release layer on the portions of the web which become tabs 28 after the die cutting operation. In some instances it may be reasonable or even cost effective to have the release agent preapplied only to the portions of the web sheet which will form the tabs 28. For example, assuming the blanks 12 are cut in side-by-side relation to one another transverse to the length of the web, with all of the tabs 28 thus being formed from a relatively narrow portion of the entire width of the web, the release layer need only be applied to the area from which the tabs 28 are formed or to that area and to some reasonable adjacent areas forming a contiguous part or parts of the body portion 22 of the blank 12. In another variation, if it is desired to provide label removal capabilities on other portions of the blanks, such as the center area of the top surface of the body, another strip of the release agent may be preapplied to the web 42W in the corresponding area.

The release agent should be one which facilitates the removal and replacement of paper adhesive labels, whereby inexpensive paper labels may be used and be peeled off with very little effort, i.e., without tearing or delaminating the label and leaving no residue from the label or the label adhesive on the support surface. To these ends, for use with paper labels bearing typical pressure sensitive adhesives, a silicone material which includes a moderate amount of CRA that provides a release value of less than two pounds, preferably less than about one pound, and particularly 20–160 grams for labels 34 adhered thereto by rubber-based or acrylic pressure sensitive adhesive such as are commonly used on present-day pressure sensitive labels is appropriate. As used herein, the term "release value" refers to the pulling force required to peel a 2" wide label from the release coating by pulling it at 180° (parallel to the plane of the label) at 300"/min. by the standard Tag and Label Manufacturing Institute (TLMI) test method.

Figure 8:
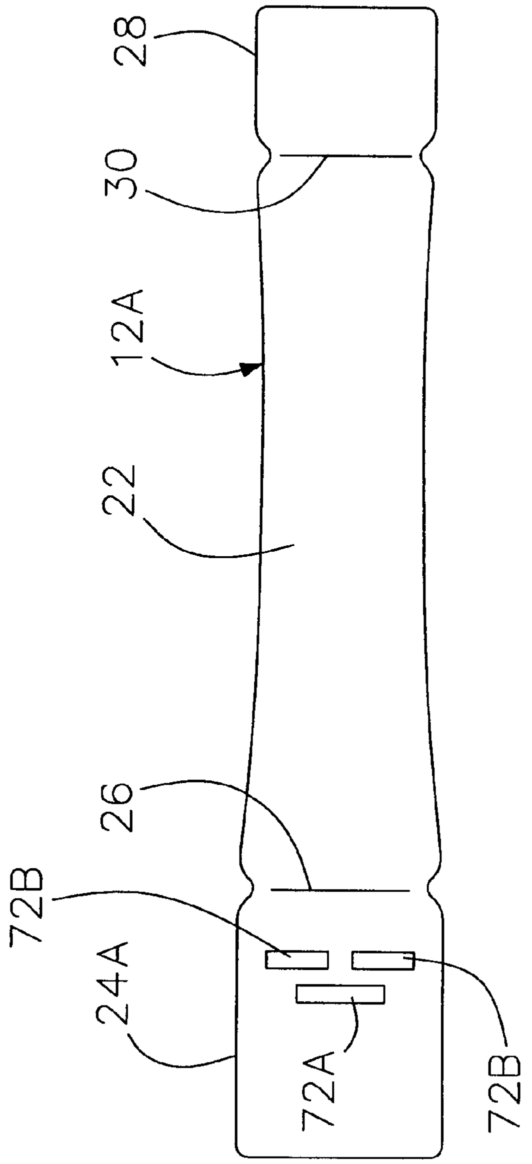
FIG. 8 is plan view of an overlay designed for use with cross bar type of product support hooks.
Figure 9:
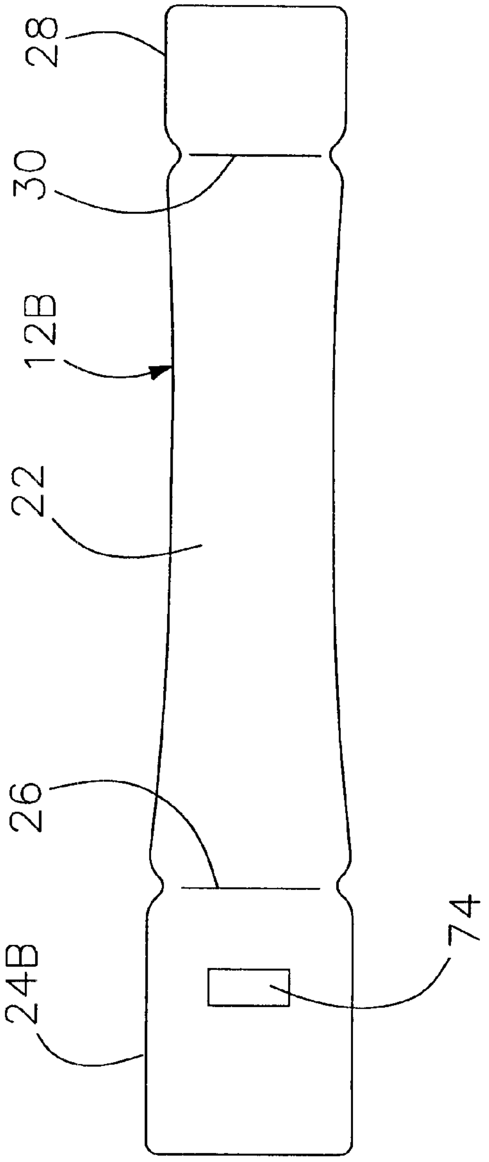
FIG. 9 is a top view of an overlay designed for use with another form of product support hooks.

The specific configuration of the overlays may vary widely. In particular, this invention may be utilized in overlays of any desired configuration to accommodate any of the various types of hook type hangers utilized in the merchandising business, including peg hooks, cross bar hooks and other so-called single bar or single arm hooks. The configuration of specific overlays can be adapted to the length and style of the hook and to the mounting technique to be used. By way of examples, and without limitation, three versions are illustrated in the drawings. The blank 12 includes a mounting flange of trifurcate configuration, including three lobes 70A, 70B and two openings 72 for engaging the mounting section 17 of a hook 14 in a known manner. FIG. 8 illustrates a blank 12A with a mounting flange 24A formed with three slots 72A and 72B cut therethrough for engaging a cross bar hook in a known manner. FIG. 9 illustrates a blank 12B with a mounting flange 24B that has a single slot 74 cut therethrough, for mounting on a cross bar hook in a known manner. Each of the blanks 12A and 12B otherwise is of the same configuration and is manufactured by the same method as described above for blank 12.

Thus it will be seen that novel and improved scanning hook overlays and methods of making such overlays with a release surface on the label attachment areas have been provided which attain the aforementioned objects. Various additional modifications of the embodiments specifically illustrated and described herein will be apparent to those skilled in the art, particularly in light of the teachings of this invention. The invention should not be construed as limited to the specific form shown and described, but instead is set forth in the following claims.

What is claimed is:

1. A method of making overlays for scanning hooks comprising the steps of:

providing thin plastic sheet stock which is foldable, affixing on at least first areas of one side of said sheet stock while in sheet form a covering which includes a securely affixed outer release coating which forms a release surface having a characteristic which causes adhesive labels to adhere thereto, when said labels are applied, but which allows such adhesive labels to be peeled cleanly from the release surface without substantial tearing or delamination of the labels;

after the affixing step cutting from the so-coated sheet stock a plurality of blanks of a configuration for forming overlays, said blanks being cut in a configuration which includes an elongate main body portion and a tab portion joined to one end of said body portion for receiving labels, said blanks being cut such that said tab portions are within said first areas of said sheet stock so as to be covered by said outer release coating;

whereby when said blank is installed as an overlay on a scanning hook, said tab portion will present an outwardly exposed label surface which will receive and retain adhesive labels and also permit easy removal and replacement of such labels.

2. A method as in claim 1 which includes the steps of forming a fold line in said overlay blank at the joinder of said body portion and said tab portion to facilitate bending of said tab portion into a substantially different plane than the adjacent portion of said body portion.

3. A method as in claim 2 including the steps of folding said tab portion into a position substantially normal to the plane of said body portion and mounting the resulting overlay on a scanning hook with said body portion overlying the scanning hook and said tab portion extending downward from said body portion at the end of the scanning hook with the side of said tab portion bearing said release coating exposed outwardly relative to the scanning hook.

4. A method as in claim 3 including the step of forming indicia on the blank to identify the side of the tab portion bearing the release coating.

5. The method as in claim 4 in which the indicia include the words "This Side Up".

6. A method as in claim 1 including the steps of folding said tab portion into a position substantially normal to the plane of said body portion and mounting the resulting overlay on a scanning hook with said body portion overlying the scanning hook and said tab portion extending downward from said body portion at the end of the scanning hook with the side of said tab portion bearing said release coating exposed outwardly relative to the scanning hook.

7. A method as in claim 6 including the steps of applying an adhesive label bearing current merchandising information to said release coating that characterizes merchandise carried on the respective scanning hook;

when the merchandise or the merchandise characteristics change, peeling said adhesive label from said label release surface and applying a new adhesive label thereto bearing updated merchandising information; and repeating said last mentioned step each time the merchandising information changes using a plurality of separate updated adhesive labels which are similarly released, when needed, by said label release surface.

8. A method as in claim 6 including the step of forming indicia on the blank to identify the side of the tab portion bearing the release coating.

9. A method as in claim 1 including affixing on at least said portion of said sheet stock a plastic film which has said release coating affixed to its outer surface.

10. A method as in claim 9 wherein said plastic film is biaxially oriented polypropylene.

11. A method as in claim 10 wherein said thin plastic stock is a polyvinyl chloride.

12. A method as in claim 10 wherein said thin plastic stock is a clear polyvinyl chloride.

13. A method as in claim 1 wherein said sheet plastic stock is a polyvinyl chloride.

14. A method of making overlays for scanning hooks comprising the steps of:

providing thin plastic sheet stock which is foldable;

affixing on at least a portion of one side of said sheet stock a covering which includes a securely affixed outer release coating which forms a release surface having a characteristic which causes adhesive labels to adhere thereto, when said labels are applied, but which allows such adhesive labels to be peeled cleanly from the release surface without substantial tearing or delamination of the labels;

thereafter cutting from the so-coated sheet stock a blank of a configuration for forming an individual overlay, said blank being cut in a configuration which includes an elongate main body portion and a tab portion joined to one end of said body portion for receiving labels, at least said tab portion being cut from the portion of said sheet stock that includes said outer release coating;

whereby when said blank is installed as an overlay on a scanning hook, said tab portion will present an outwardly exposed label surface which will receive and retain adhesive labels and also permit easy removal and replacement of such labels; and wherein said affixing step comprises affixing such a covering which includes a securely affixed outer release coating over substantially the entire area of said plastic sheet stock.

15. A method of making overlays for scanning hooks comprising the steps of:

providing thin polyvinyl chloride plastic sheet stock which is foldable without memory;

affixing on a plurality of first areas and not on a plurality of second areas of one side of said sheet stock while in sheet form a film of biaxially oriented polypropylene which has a silicone release coating securely affixed to its outer side and which silicone release coating has a characteristic which causes adhesive labels of paper to adhere thereto, when such labels are applied, but which allows such paper labels to be peeled cleanly from the label release surface without substantial tearing or delamination of the labels;

after the affixing step cutting from the so-coated sheet stock a plurality of overlay blanks each of a configuration which includes an elongate main body portion and a tab portion joined to one end of said body portion by a score line for later bending into a position substantially normal to said main body portion for receiving labels on the release coating surface of said tab portion, the cutting being oriented with respect the coated sheet stock such that the first areas which carry the release coating cover the tab portion of the blanks and the second areas of the sheet stock correspond to the main body portion of the blanks; and whereby when said blank is installed as an overlay on a scanning hook, said tab portion will present an outwardly exposed label surface which will receive and retain adhesive labels and also permit easy removal and replacement of such labels.

16. A method as in claim 15 including the steps of folding said tab portion of each of said blanks into a position substantially normal to the plane of the respective body portion and mounting the resulting overlays on scanning hooks with said body portions overlying the respective scanning hooks and said tab portions extending downward from the respective body portions at the end of the respective scanning hooks with the side of each said tab portion bearing said release coating exposed outwardly relative to the respective scanning hook.

17. A method as in claim 16 including the step of forming indicia on the blank to identify the side of the tab portion bearing the release coating.

* * * * *